*(12)* United States Patent
Friedman

(10) Patent No.: US 7,168,715 B1
(45) Date of Patent: Jan. 30, 2007

(54) COLLAPSIBLE CART

(76) Inventor: Neil Friedman, 22467 Arcadia Ct., Boca Raton, FL (US) 33433

( * ) Notice: Subject to any disclaimer, the term of this patent is extended or adjusted under 35 U.S.C. 154(b) by 0 days.

(21) Appl. No.: 11/264,991

(22) Filed: Nov. 2, 2005

(51) Int. Cl.
*B62B 3/02* (2006.01)
(52) U.S. Cl. .............................. 280/47.35; 280/47.19; 280/33.991; 280/33.996
(58) Field of Classification Search .......... 280/33.991, 280/33.995, 33.996, 47.35, 47.18, 47.19, 280/47.24, 47.27, 47.28, 47.29, 47.34, 654, 280/655, 79.3
See application file for complete search history.

(56) References Cited

U.S. PATENT DOCUMENTS

| | | | | | |
|---|---|---|---|---|---|
| 2,133,834 | A | * | 10/1938 | Sheldon | .................... 280/47.35 |
| 2,901,262 | A | * | 8/1959 | Berlin | ......................... 280/641 |
| 3,052,484 | A | * | 9/1962 | Huffman et al. | ............. 280/654 |
| 3,804,432 | A | * | 4/1974 | Lehrman | .................... 280/654 |
| 4,185,848 | A | | 1/1980 | Holtz | |
| 4,363,496 | A | * | 12/1982 | Schreiner | ................. 280/47.35 |
| 5,192,092 | A | * | 3/1993 | DiBenedetto | ............... 280/654 |
| 5,435,582 | A | * | 7/1995 | Davidson | .............. 280/33.992 |
| 5,507,507 | A | * | 4/1996 | Davidson | .............. 280/33.991 |
| 5,531,366 | A | | 7/1996 | Strom | |
| 5,595,395 | A | * | 1/1997 | Wilson | ..................... 280/47.26 |
| D399,625 | S | * | 10/1998 | Murphy et al. | ............... D34/21 |
| 5,845,915 | A | * | 12/1998 | Wilson | ..................... 280/47.19 |
| 5,865,449 | A | * | 2/1999 | Castaneda | .............. 280/33.996 |
| D407,882 | S | | 4/1999 | Duchene | |
| 6,131,926 | A | * | 10/2000 | Harlan | ..................... 280/47.26 |
| D455,243 | S | | 4/2002 | Walter | |
| 6,454,293 | B1 | * | 9/2002 | Anderson | .................... 280/651 |
| D472,026 | S | | 3/2003 | Walter | |
| 6,616,152 | B2 | * | 9/2003 | Oliver | ...................... 280/47.18 |
| 6,659,476 | B2 | * | 12/2003 | Weida | ...................... 280/47.19 |
| 6,843,488 | B1 | * | 1/2005 | Tseng | ....................... 280/47.35 |
| 6,929,269 | B2 | * | 8/2005 | Oliver | ...................... 280/47.18 |
| 6,932,363 | B2 | * | 8/2005 | D'Angelo | .............. 280/33.991 |
| 6,945,546 | B2 | * | 9/2005 | Guirlinger | ............... 280/47.19 |
| 7,080,844 | B2 | * | 7/2006 | Espejo | ................... 280/33.995 |
| 2003/0001348 | A1 | * | 1/2003 | Weida | ...................... 280/47.19 |

FOREIGN PATENT DOCUMENTS

FR      2569151    *   8/1986
JP      0232457 A2   *   8/1987

* cited by examiner

*Primary Examiner*—J. Allen Shriver
(74) *Attorney, Agent, or Firm*—Dale J. Ream

(57) ABSTRACT

A collapsible cart for transporting multiple items having a horizontal platform with wheels for maneuvering, and a plurality of detachable baskets mounted on basket supporting assemblies. The basket supporting assemblies are pivotally mounted so as to be capable of independent deployment and stowing to facilitate loading and unloading in turn.

12 Claims, 7 Drawing Sheets

COLLAPSIBLE CART

BACKGROUND OF THE INVENTION

1. Field of the Invention

The present invention generally relates generally to wheeled carts, and more particularly to collapsible carts for transporting multiple items.

2. Description of the Prior Art

Wheeled carts have long been in use for a variety of purposes. A cart bears the weight of a load of items to be carried and frees the hands of a user for other activities. Wheeled carts are frequently used in grocery stores, where customers view a large variety of merchandise and typically select a relatively large quantity of separate items for purchase. In recent years consumers have favored large multi-purpose stores for items such as hardware, clothing, office supplies and other merchandise. Many of these stores offer shopping carts, for use by customers while they are in the stores. Customers shopping for groceries, hardware and other products push a cart along as they shop. When an item is selected for purchase it is placed in the cart. The customer may continue to shop for additional items without the need for hand carrying the items already selected. Typical shopping carts have the capacity to hold a large quantity of merchandise and are generally convenient to use; however, they do have some drawbacks. As a shopping cart becomes filled, the merchandise at the bottom tends to be crushed by the other items. This can be a problem with certain fragile food items. In stores that offer a wide variety of merchandise, a customer may wish to avoid mixing clothing, food, hardware, and other items. Typically, shopping carts do not have separate compartments. Additionally, a customer may wish to view the items in a shopping cart to refresh the memory as to which items have already been selected and placed in the cart. When many items have been loaded in a typical shopping cart, it may be difficult to view all of them.

When the customer is finished shopping, he or she pays for all of the merchandise in the cart. After leaving the cashier, the customer may have to hand-carry their merchandise, typically bagged, to a parked vehicle. Some stores allow the customers to wheel the cart to a loading area, or to wheel the cart to the location of the customer's vehicle, where the merchandise is transferred to the vehicle. Once the items have been transferred to a customer's vehicle, the shopping cart must be returned to a storage area of the store. Consequently, upon arriving home to unload the merchandise, the customer must typically make several trips back-and-forth from the vehicle to the home, hand-carrying the bagged merchandise without the aid of a cart.

There is a need for a compact versatile cart, which can be owned by a user and carried to and from the store in the user's vehicle. It would be desirable to provide such a cart having separate compartments, each for carrying particular merchandise, to facilitate handling and viewing. It would be further desirable to provide such a cart that facilitates transport of products between the vehicle and the home, as well as from the store to the vehicle. In that regard, it would be desirable to provide such a cart that would enable a user to transport an entire shopping cart of merchandise, from the vehicle to the home, in only one trip.

SUMMARY OF THE INVENTION

The present invention is directed to a collapsible, wheeled cart for use shopping for multiple items of merchandise, and for other purposes. The cart of the present invention is comprised of a platform, a rack, a plurality of basket-supporting assemblies, and a plurality of baskets. The platform is a horizontally disposed rigid planar structure with a set of rotatable wheels attached to it. The rack is mounted on the platform, in a perpendicular relation, and includes means for partial disengagement to allow he cart to be folded into a collapsed state for storage or transport by vehicle. The rack is formed of rigid members mounted in a spaced-apart relation and extending upward in parallel relationship with each other. The cart has a handle mounted on at least one of the members, for manually propelling and maneuvering the cart.

The basket-supporting assemblies are operable for alternately stowing and deploying the baskets. Each one of the basket-supporting assemblies includes a pair of rigid upper support arms and a pair of rigid lower support arms. The pair of upper support arms is aligned in a spaced-apart parallel relation, defining an interior space therebetween for receiving one of the baskets. Each of the upper support arms is rotatably and slidably attached to a one of the lower support arms, to allow cooperative movement.

Attachment means are provided for attaching the basket-supporting assemblies to the rack in spaced-apart locations. The upper support arms and the lower support arms are provided with upper support arm pivots and lower support arm pivots, respectively. The members are provided with aligned pairs of channels and wells, for retaining the upper support arm pivots and the lower support arm pivots, respectively. The upper support arm pivots are releasably retained within the channels. The lower support arm pivots are rotatably retained within the wells. Any of the basket-supporting assemblies may be grasped from a position at the rear of the cart, and manually pulled to release the upper support arm pivots and then slide one of the basket supporting assemblies into a stowed position. Any of the basket-supporting assemblies may be deployed by simply pushing the respective basket forward to engage the channels. The channels and wells are located such that, when deployed, the upper support arms extend horizontally.

The basket supporting assemblies and the baskets are provided with cooperating means for selective release and attachment of the baskets to the basket supporting assemblies. Items may be loaded onto the platform while the basket supporting assemblies and attached baskets are stowed and out of the way. Basket supporting assemblies, with baskets, may be easily deployed and loaded in turn. Also, baskets may be detached from the cart and carried separately, by hand.

It is an object of the present invention to provide a collapsible cart that can be easily transported to a location, in a compact stowed state, and then unfolded, or deployed, for use.

It is a further object of the present invention to provide a collapsible cart having a plurality of baskets that can be stowed until needed and independently deployed and loaded, in turn.

It is yet another object of the present invention to provide a collapsible cart having a plurality of baskets that can be detached from the cart and hand carried separately.

BRIEF DESCRIPTION OF THE DRAWINGS

The invention will be further understood, by way of example, with reference to the accompanying drawings, in which.

DETAILED DESCRIPTION OF THE PREFERRED EMBODIMENTS

Shown throughout the drawings, the present invention is generally directed to a collapsible cart having a plurality of baskets capable of being independently stowed or deployed, and which are capable of being detached from the cart and carried separately.

Figure 1:
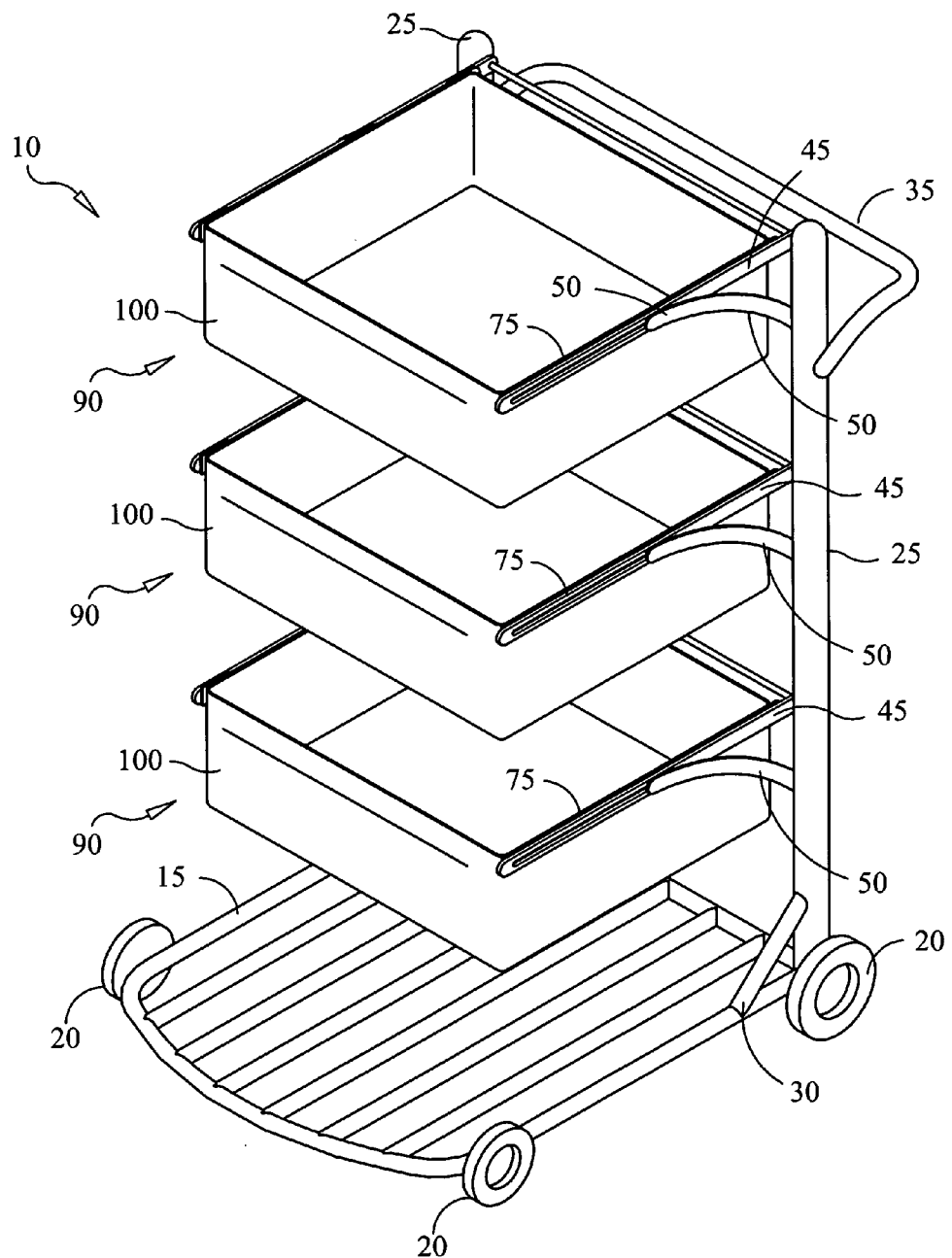
FIG. 1 is a perspective view of the cart of the present invention.

Referring initially to FIGS. 1–7, a preferred embodiment of the collapsible cart of the present invention is indicated by reference numeral 10. As shown in FIG. 1, the cart 10 includes a horizontally disposed platform 15 and a set of wheels 20 rotatably mounted on the platform 15. The platform 15 is preferably formed of rigid lightweight material such as aluminum, steel or plastic. The platform 15 may be formed of a solid sheet of material or, alternatively, a plurality of interconnected rungs, as shown in FIG. 1, or a lattice structure, such as a wire mesh, may be used. Wheels 20 may be formed of metal, plastic, or other suitable material and may include a solid rubber tire. The cart 10 of the present invention is shown in FIG. 1 with a set of four wheels 20; however, a tricycle arrangement or other known configuration would be suitable. A rack is provided preferably in the form of a pair of rigid members 25 attached perpendicularly to the platform and extending upward in parallel relation. The members 25 may be formed of the same materials, which are named for use in forming the platform 15, and the members 25 may be attached by conventional means such as welding, brazing, or gluing. A pair of angle braces 30 may be added to improve the structural integrity of the cart 10.

It is preferred that the cart 10 is constructed so as to be collapsible. Conventional means, such as a hinged connections (not shown) between the platform 15 and the members 25, or a pair or upstanding sleeves (not shown) attached to the platform 15 and designed to receive the lower ends of the members 25, may be used to allow the members 25 to fold to a horizontal position in alignment with the platform 15, to provide for compact storage of the cart 10.

It is preferred that a handle 35 is attached to at least one of the members 25, as shown in FIG. 1. The handle 35 may be attached by welding, brazing, gluing, or other means to allow a user to manually propel and maneuver the cart 10.

Items may be loaded onto the platform 15 to be transported. Additional items may be carried by a plurality of baskets 90 included on the cart 10 of the present invention. FIG. 1 depicts a cart 10 with three baskets 90; a lowermost basket, a middle basket and an uppermost basket. However, the present invention, as disclosed herein, is not intended to be restricted to a three-basket arrangement. The present invention includes a plurality of basket-supporting assemblies 40 such that one of the basket supporting assemblies 40, as shown in FIG. 2, is included for each of the baskets 90 to be provided on the cart 10.

Figure 2:
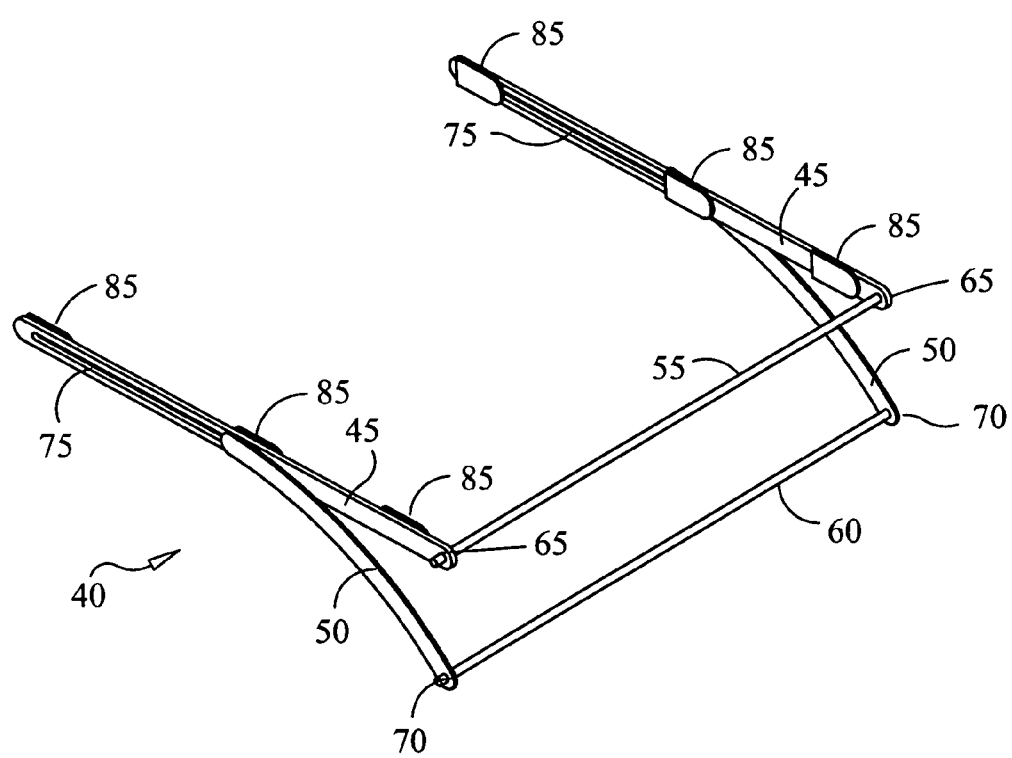
FIG. 2 is a perspective view of the basket supporting assembly of the present invention.
Figure 6:
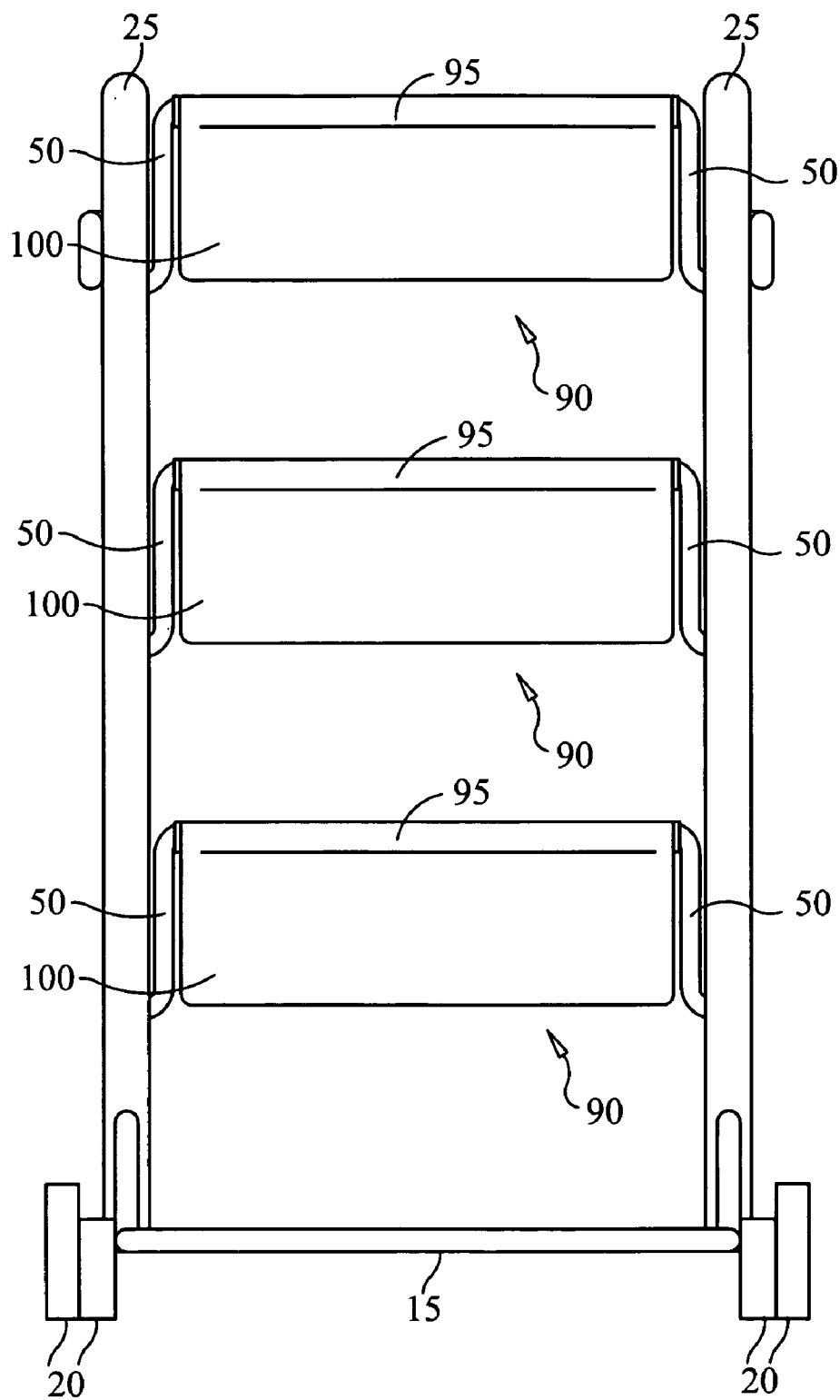
FIG. 6 is a front elevation view of the cart of the present invention.

One of the basket-supporting assemblies 40, as shown in FIG. 2, includes a pair of upper support arms 45 and a pair of lower support arms 50. The upper support arms 45 are spaced apart, oriented in a horizontal plane, and aligned in parallel relation, to define an interior space therebetween, such that the pair of upper support arms 45 may be disposed between the members 25. The upper support arms 45 and the lower support arms 50 are preferably formed of rigid steel or aluminum stock having a horizontal thickness of approximately less that 1 centimeter and a greater width. It is intended that the horizontal dimension of the upper support arms 45 and the lower support arms 50 should be minimized in order to maximize the width capacity for the baskets 90, as shown in FIG. 6. The upper support arms 45 and the lower support arms 50 have proximal and distal ends. Each of the upper support arms 45 is provided with a longitudinally extending slot 75 located near the distal end. It is preferred that the slot 75 should extend to a point near to the mid-point of each of the upper support arms 45. Each of the lower support arms 50 is slidably and rotatably secured to one of the upper support arms 45 by a pin attached near the distal end of one of the lower support arms 50 and disposed within the slot 75 of one of the upper support arms 45. The proximal ends of the upper support arms 45 are connected by an upper support arm rod 55, which extends between the upper support arms 45, passes through a hole provided in each of the proximal ends of each of the upper support arms 45, and continues a distance to protrude from the outer aspect of each of the upper support arms 45 to form a pair of upper support arm pivots 65. The connection between the upper support arms 45 and the upper support arm rod 55 may be welded, brazed or glued.

In a like manner, the proximal ends of the lower support arms 50 are connected by a lower support arm rod 60, which extends between the lower support arms 50, passes through a hole provided in each of the proximal ends of each of the lower support arms 50, and continues a distance to protrude from the outer aspect of each of the lower support arms 50 to form a pair of lower support arm pivots 70.

Attachment means are provided for attaching the basket-supporting assemblies 40 to the rack. The members 25 may be provided with a plurality of aligned pairs of channels 80 and wells (not shown), for retaining the upper support arm pivots 65 and the lower support arm pivots 70, respectively. The channels 80 are located on the inner aspect of the members 25, extend horizontally, and open toward the rear of the cart 10. One of the pair of channels 80 is located on each of the members 25, and the pair of channels 80 is positioned at equal height. The upper support arm pivots 65 are releasably retained within the channels 80. It is preferred that each of the channels 80 be provided with a releasable retaining clip (not shown), of conventional manufacture, to releasably retain the upper support arm pivots 65 within the channels 80. The lower support arm pivots 70 are rotatably retained within the wells. A pair of plugs (not shown) may be fixed to the lower support arm pivots 70, and the size of the wells may be increased to correspond with the plugs to provide more secure support for the lower support arms 50. It is intended that the upper support arm rod 55 and the lower support arm rod 60 should be of sufficient length to span the distance between the members 25 plus an additional length necessary for the upper support arm pivots 65 and the lower support arm pivots 70 to be received into the channels 80 and the wells, respectively.

Figure 4:
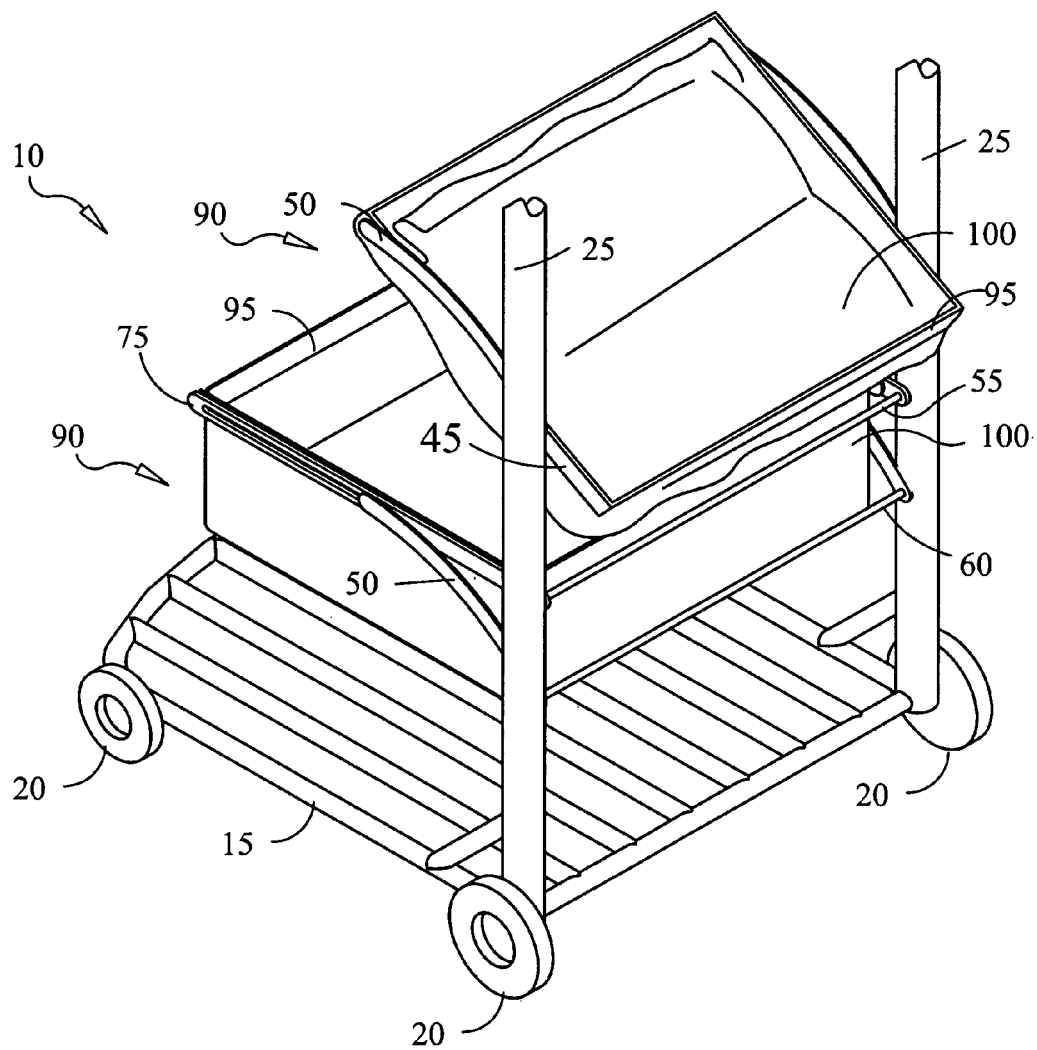
FIG. 4 is a rear perspective view of the cart of the present invention showing a lowermost basket fully deployed and a middle basket partially deployed.

The upper support arm rod 55 may be grasped from a position at the rear of the cart 10, and manually pulled to release the upper support arm pivots 65 and then slide one of the basket-supporting assemblies 40 into a stowed position, as shown in FIG. 4. Each of the basket-supporting assemblies 40 may be deployed, by pushing the upper support arm rod 55 forward to engage the channels 80. The channels 80 and the wells are located such that, when deployed, the upper support arms 45 extend horizontally, as shown in FIG. 1.

Figure 5:
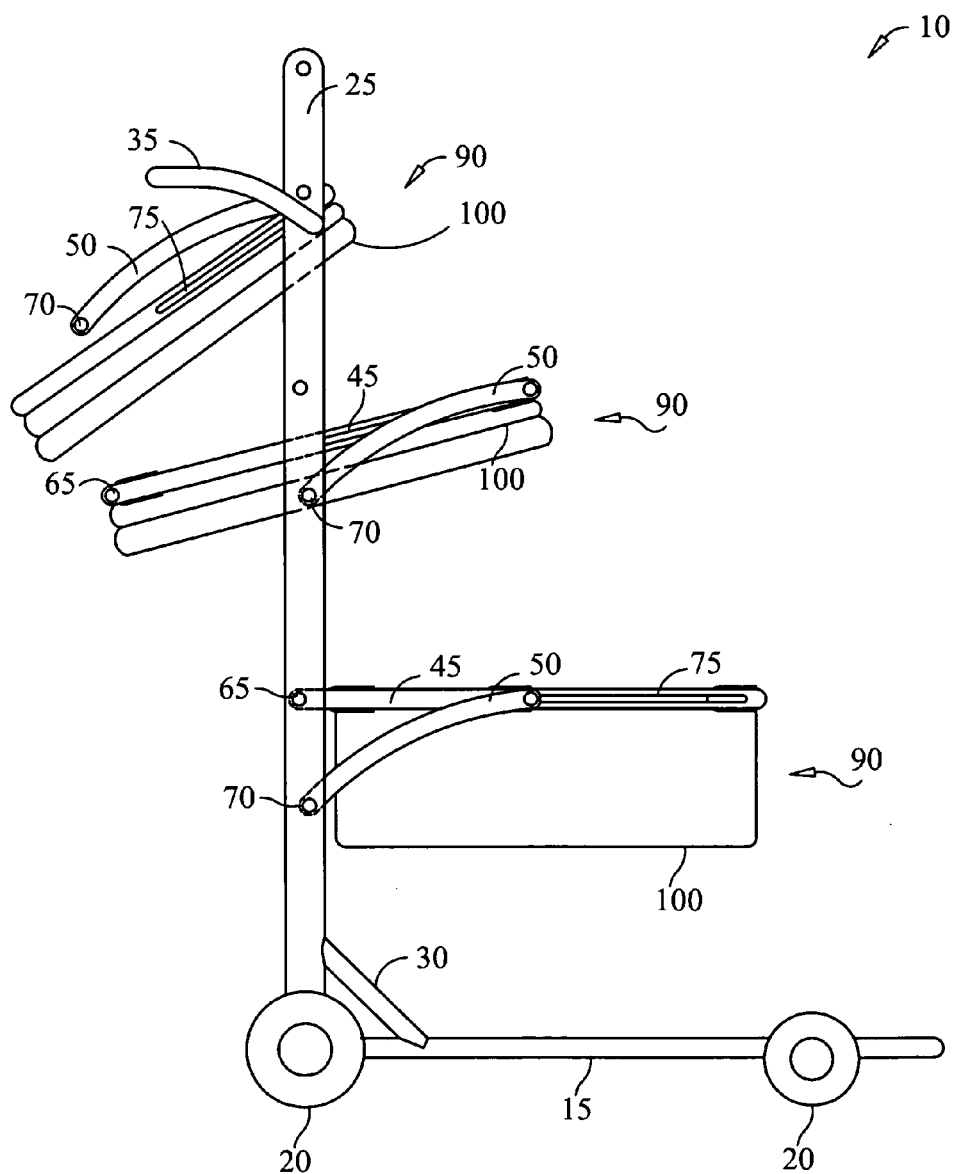
FIG. 5 is a side elevation view of the cart of the present invention showing a lowermost basket fully deployed, a middle basket partially deployed and an uppermost basket stowed.

A version of the present invention is contemplated wherein the lower support arm pivots 70 may also be disengaged so that the basket-supporting assemblies 40 may be entirely removed from the cart 10, as depicted by the uppermost basket in FIG. 5. In this alternative version of the present invention, the members 25 are provided with a plurality of pairs of channels on the inner aspect, opening toward the rear of the cart 10, and extending horizontally. One of a first pair of channels is positioned on each of the members 25, and the corresponding one of the first pair is located on the other of the members 25 and positioned at an equal height. A second pair of channels is likewise provided at locations lower than the first pair. Two pairs of channels serve to support each of the basket-supporting assemblies 40. It is intended that when the upper support arm pivots 65 are engaged within the first pair of channels, and the lower support arm pivots 70 are engaged within the second pair of channels, the upper support arms extend forward horizontally, as shown in FIG. 1.

In use, the upper support arm rod 55 of one of the basket supporting assemblies 40 may be grasped, manually disengaged from the channels 80, and drawn toward the rear of the cart 10, causing one of the basket-supporting assemblies 40 to rotate about the lower support arm pivots 70, and each of the pins, at the distal ends of the lower support arms 50, to traverse the slot 75 toward the distal ends of the upper support arms 55, as shown in FIG. 4. In this manner, one of the basket-supporting assemblies 40 may be stowed out of the way of the access path to the platform 15, or another of the baskets 90 located below.

Figure 3A:
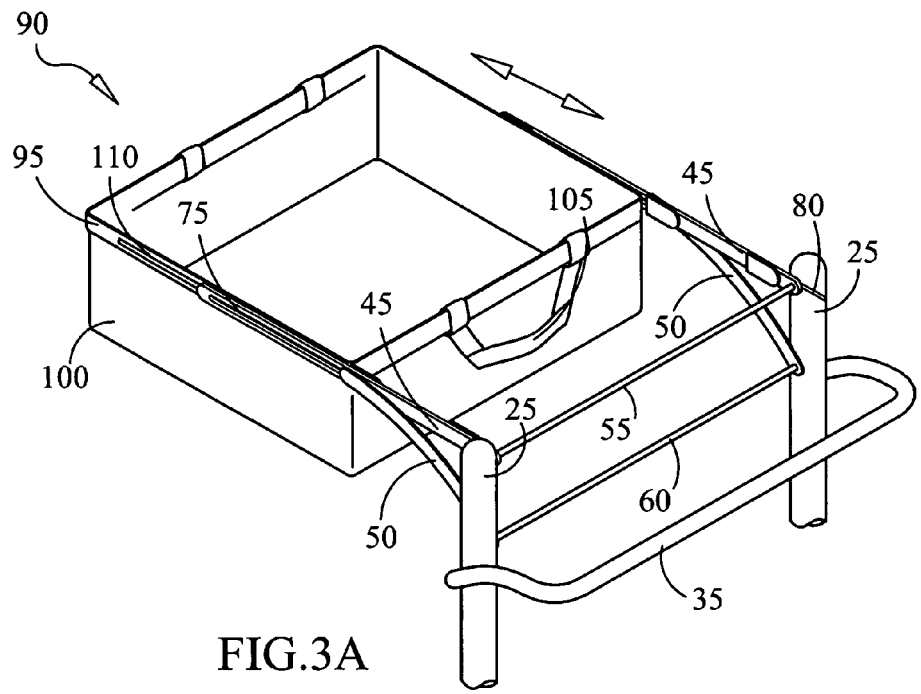
FIG. 3A is a rear perspective view of a basket of the present invention partially installed on a basket supporting assembly with a double-headed arrow showing the direction of movement to manually install or detach the basket.
Figure 3B:
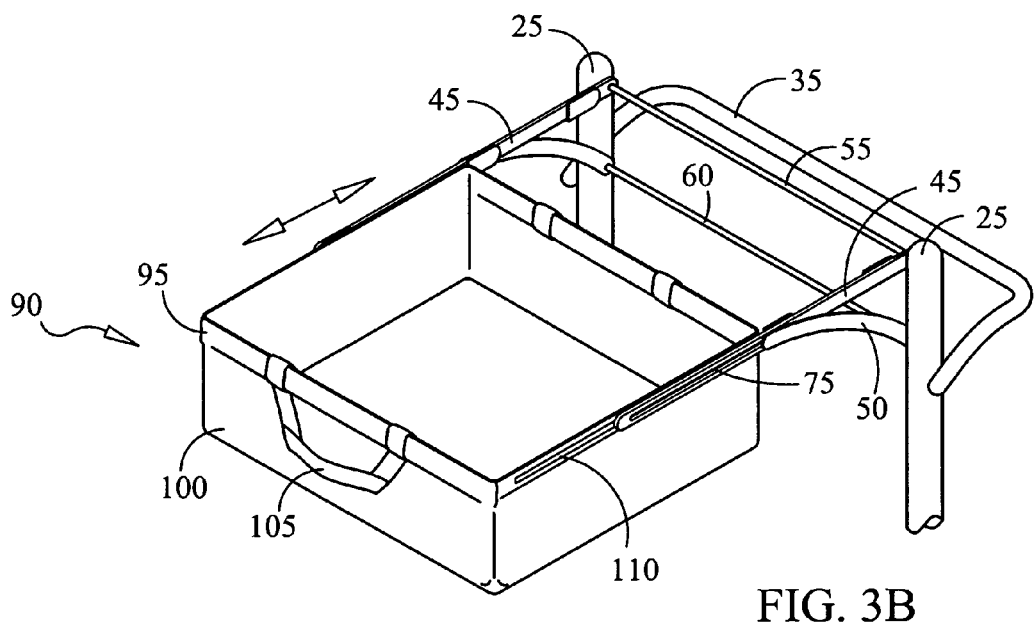
FIG. 3B is a front perspective view of a basket of the present invention partially installed on the basket supporting assembly with a double headed arrow showing the direction of movement to manually install or detach the basket.
Figure 7:
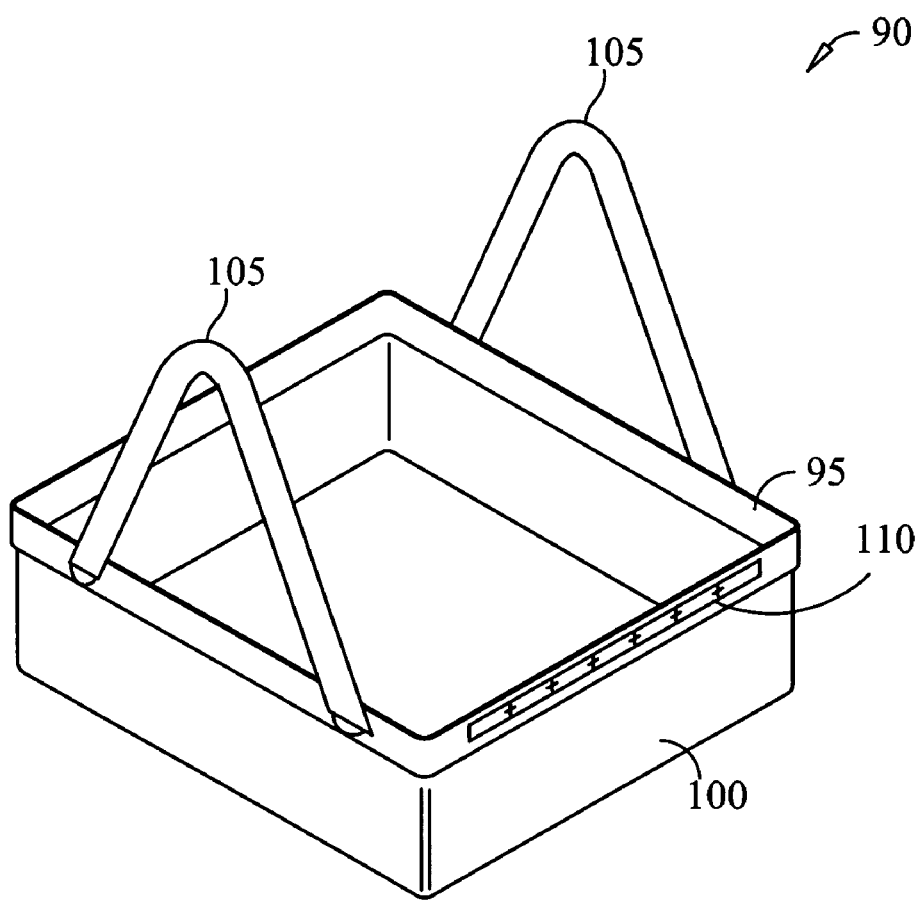
FIG. 7 is a perspective view of a basket of the present invention detached from the basket supporting assembly and ready for use as a hand basket.

It is preferred that the inner aspects of the upper support arms 45 are provided with a plurality of tabs 85 for receiving and retaining baskets 90 as shown in FIG. 2. The tabs 85 are formed in a curved shape having upper and lower flanges. Plastic is a suitable material for forming the tabs 85. Preferably, a plurality of baskets 90 is provided in one-to-one correspondence with the basket supporting assemblies 40. Each of the baskets 90 is formed with a rigid frame 95 of generally rectangular shape. The material used for forming the support arms is also suitable for forming the frame 95. It is intended that at least one horizontal dimension of the frame 95 should be selected to match the inside space between the upper support arms 45, so that a basket 90 may be inserted between a pair of upper support arms 45. Each of the baskets 90 is provided with a receptacle 100 which may be rigid or flexible, as desired. Canvas or other natural or synthetic fabrics are suitable materials for forming a flexible receptacle 100. Plastic or cardboard are suitable for forming a rigid receptacle 100. The baskets 90 are provided with straps 105, for hand-carrying the baskets, and a pair of tracks 110, mounted on opposite sides of the frame 95, for engaging the tabs 85 on the upper support arms 45 to releasably secure the baskets 90 on the upper support arms 45. The tracks 110 are preferably formed of an elongated plastic body having a generally "C" shaped cross section designed to slidably engage the upper and lower flanges on the tabs 85. It is to be understood that the baskets 90 may be hand-carried by the straps 105 and used separately from the cart 10, as shown in FIG. 7. The baskets 90 may also be positioned so that the tracks 110 are in alignment with the tabs 85, and manually moved to a fully engaged position, as shown in FIGS. 3A and 3B. It is also to be understood that the basket-supporting assemblies 40 may be stowed, as described above, while the baskets 90 are engaged, as shown in FIGS. 4 and 5.

In order to provide additional convenience, a version of the present invention having a motorized apparatus for deploying the baskets 90 is contemplated. It is preferred that the cart 10 include a battery-powered electric motor for driving each of the basket-supporting assemblies 40 between stowed and deployed positions. A conventional battery pack (not shown), which may include rechargeable or non-rechargeable batteries, is attached to the rear portion of the platform. A plurality of motorized apparatus is provided in one-to-one correspondence with the basket supporting assemblies 40.

Preferably, each of the motorized apparatus operates one of the basket-supporting assemblies 40, and includes a motor mounting plate (not shown) which is rotatably attached to the inner aspect of one of the pair of members 25, at a point below one of the channels 80. The motor mounting plate is provided with an integral portion extending upward adjacent to one of a pair of the upper support arms 45, and having an upper and a lower horizontal extension forming a guide for slidably confining the upper support arms 45. Likewise, a plate, having a shape similar to that of the motor mounting plate, is rotatably attached to the inner aspect of the other of the pair of members 25, at a point opposite the motor mounting plate. Similarly, the plate is provided with an integral portion extending upward adjacent to the other of the said pair of upper support arms 45, and having an upper and a lower horizontal extension forming a guide for slidalby confining the other one of the pair of upper support arms 45. It is intended that the upper support arms 45 may slide through the guides, while the motor mounting plate and the plate rotate in tandem with the rotation of the lower support arm pivots 70, to maintain a constant spatial relation with the upper support arms 45, as the aforementioned one of the basket supporting assemblies 40 moves between the stowed and the deployed position.

Preferably, each of the motorized apparatus further includes a drive shaft (not shown) spanning the interior space, and supported at each end by being rotatably seated in a bushing provided in the motor mounting plate and the plate, respectively. Each of the pair of upper support arms 45 is provided with a row of teeth (not shown) along the lower edge, and a pair of gears is provided in attached relation on the drive shaft, each of which is sized and configured to mesh with one of the rows of teeth on one of the pair of support arms 45. An electric motor (not shown) is provided and attached to the motor mounting plate with a conventional transmission (not shown) to transfer the motive force from the electric motor to the drive shaft, for turning the drive shaft.

Wiring and a switch (not shown) are provided to supply power from the battery pack to the electric motor. Preferably the switch is a three-position toggle switch mounted on the rear portion of a one of the pair of members 25, and is configured so as to provide an "Off" position and two "On" positions, for operation of the electric motor in two directions. It is intended that a user would throw the switch to energize the motor and cause one of the basket supporting assemblies 40 to deploy. The user would throw the switch to energize the electric motor in the opposite direction, to stow the one of the basket supporting assemblies 40. It is to be understood that a motorized apparatus and a switch would be provided for each of the basket supporting assemblies 40, such that each of the basket-supporting assemblies 40 could be deployed or stowed independently.

While the preferred embodiments of the invention have been described above, it will be recognized and understood that various modifications can be made in the invention and the appended claims are intended to cover all such modifications which may fall within the spirit and scope of the invention.

What is claimed is:

1. A collapsible cart for transporting multiple items comprising:
    a platform, a rack, a plurality of basket supporting assemblies and a plurality of baskets;
    said platform being a horizontally disposed rigid planar structure having a set of rotatably mounted wheels attached thereto;
    said rack being mounted on said platform in generally perpendicular relation and having attachment means for attaching said basket supporting assemblies to said rack, in spaced apart locations;
    said basket supporting assemblies being operable for alternately stowing and deploying said baskets;
    said basket supporting assemblies and said baskets having cooperative means for selective release and attachment of said baskets to said basket supporting assemblies;
    wherein said platform includes a generally rectangular shape having a front portion and a rear portion;
    wherein said rack includes a pair of rigid members mounted on the rear portion of said platform, in spaced apart relation and extending upward in generally parallel relation with each other;
    wherein each of said basket supporting assemblies comprises:
        a pair of rigid upper support arms and a pair of rigid lower support arms, said pair of upper support arms being aligned in spaced apart parallel relation defining an inside space therebetween;
        each of said upper support arms and each of said lower support arms having a proximal end and a distal end;
        each of said upper support arms having a longitudinally extending slot near the distal end and a one of said lower support arms rotatably and slideably attached to each of said upper support arms, by a pin attached near the distal end of said lower support arm and disposed within said slot;
        an upper support arm rod connecting said upper support arms, spanning said inside space, passing through a hole provided in each of the proximal ends of the pair of upper support arms, and continuing a distance to form a pair of upper support arm pivots adjacent to the outer aspect of each of said upper support arms; and
        a lower support arm rod connecting the proximal ends of the lower support arms in the same manner and forming a pair of lower support arm pivots adjacent to the outer aspect of each of said lower support arms.

2. The collapsible cart of claim 1, wherein each of said attachment means comprises:
    a pair of channels formed on the inner aspect of said pair of members, such that each of the pair of members has a one of the pair of channels, for releasably retaining a one of said upper support arm pivots therein;
    said pair of channels being located at approximately equal height;
    a pair of wells formed on the inner aspect of said pair of members, such that each of the pair of members has a one of the pair of wells, for rotatably mounting a one of said lower support arm pivots therein; and
    said pair of wells being located at approximately equal height to achieve a horizontal orientation of said lower support arm rod and being located below said pair of channels so as to place said upper support arms in an approximately horizontal orientation when said upper support arm pivots are retained within said pair of channels.

3. The collapsible cart of claim 1 wherein each of said attachment means comprises:
    a first pair of channels formed on the inner aspect of said pair of members, such that each of the pair of members has a one of the first pair of channels, for releasably retaining a one of said upper support arm pivots therein;
    said first pair of channels being located at approximately equal height;
    a second pair of channels formed on the inner aspect of said pair of members, such that each of the pair of members has a one of the second pair of channels, for releasably and rotatably retaining a one of said lower support arm pivots therein; and
    said second pair of channels being located at approximately equal height to achieve a horizontal orientation of said lower support arm rod and being located below said first pair of channels so as to place said upper support arms in an approximately horizontal orientation when said upper support arm pivots are retained within said first pair of channels and said lower support arm pivots are retained within said second pair of channels.

4. The collapsible cart of claim 1, further comprising a handle attached to at least one of said members, for manually propelling and maneuvering said cart.

5. The collapsible cart of claim 1 wherein said baskets comprise:
    a rigid horizontally oriented frame of generally rectangular shape;
    said frame being sized such that at least one dimension matches the dimension of said inside space between a said pair of upper support arms; and
    a receptacle attached to said frame and extending downward therefrom, for receiving one or more of said items.

6. The collapsible cart of claim 5 wherein said cooperative means for selective release and attachment of said baskets to said basket supporting assemblies includes:
    a plurality of tabs mounted on the inner aspect of said upper support arms;
    a pair of tracks attached to opposite sides of said flame designed for releasable engagement with said tabs to securely support each of said baskets.

7. The collapsible cart of claim 6 wherein:

said tabs are formed with a curved shape having an upper flange and a lower flange;

said tracks are formed of elongated bodies having a generally "C" shaped cross-section sized to slideably engage said upper flange and said lower flange of said tabs.

8. The collapsible cart of claim 7 wherein said receptacle is formed of flexible material.

9. The collapsible cart of claim 7 wherein said receptacle is formed of rigid material.

10. The collapsible cart of claim 7 wherein said baskets are provided with straps for carrying separately by hand.

11. The collapsible cart of claim 1 wherein said rack is provided with means for partial disengagement from said platform, for folding said cart into a collapsed state to facilitate storage.

12. A collapsible cart for transporting multiple items, comprising:

a platform, a rack, a plurality of basket supporting assemblies and a plurality of baskets;

said platform being a horizontally disposed rigid planar structure having a set of rotatably mounted wheels attached thereto;

said rack being mounted on said platform in generally perpendicular relation and having attachment means for attaching said basket supporting assemblies to said rack, in spaced apart locations;

said basket supporting assemblies being operable for alternately stowing and deploying said baskets;

said basket supporting assemblies and said baskets having cooperative means for selective release and attachment of said baskets to said basket supporting assemblies;

electronic means for alternately stowing and deploying said baskets, said electronic means including:

a battery pack;

a motorized apparatus;

a switch; and wiring means connecting said battery pack, said switch and said motorized apparatus for selectively energizing said motorized apparatus to stow and deploy said baskets.

* * * * *